| United States Patent [19] | [11] 3,969,331 |
|---|---|
| Fauser | [45] July 13, 1976 |

[54] HYDROCARBON POLYMER

[75] Inventor: Ernest E. Fauser, Cuyahoga Falls, Ohio

[73] Assignee: The Goodyear Tire & Rubber Company, Akron, Ohio

[22] Filed: May 21, 1975

[21] Appl. No.: 579,351

Related U.S. Application Data

[63] Continuation of Ser. No. 317,991, Dec. 26, 1972, which is a continuation of Ser. No. 72,528, Sept. 15, 1970, which is a continuation of Ser. No. 600,726, Dec. 12, 1966, abandoned.

[52] U.S. Cl. .............................. 526/66; 526/154; 526/308; 526/916
[51] Int. Cl.$^2$ ................ C08F 210/00; C08F 212/00
[58] Field of Search ................................. 260/80.78

[56] References Cited

UNITED STATES PATENTS

| 3,753,960 | 8/1973 | Easterbrook ..................... 260/80.78 |
|---|---|---|
| 3,879,343 | 4/1975 | DeBrunner ...................... 260/45.78 |

FOREIGN PATENTS OR APPLICATIONS

| 1,170,406 | 11/1969 | United Kingdom |
|---|---|---|
| 1,192,770 | 5/1970 | United Kingdom |

*Primary Examiner*—Joseph L. Schofer
*Assistant Examiner*—A. L. Clingman
*Attorney, Agent, or Firm*—F. W. Brunner; H. C. Young, Jr.

[57] ABSTRACT

Polymers of ethylene, an alpha mono-olfin, and ethylidene bicycloheptene which can be sulfur-cured to form elastomers.

4 Claims, No Drawings

HYDROCARBON POLYMER

This is a continuation of application S.N. 317,991 filed Dec. 26, 1972, which was a continuation of S.N. 72,528 filed Sept. 15, 1970 (which was a streamline continuation of parent application S.N. 600,726 filed Dec. 12, 1966, now abandoned).

This invention relates to new hydrocarbon polymers. In particular, this invention relates to hydrocarbon polymers of ethylene, another alpha monoolefin and a non-conjugated diolefin. More particularly, the invention relates to such hydrocarbon polymers which can be sulfur cured to form elastomeric materials and to a method of preparing such polymers.

Olefinic hydrocarbons having single carbon-to-carbon double bonds, particularly alpha monoolefins such as ethylene and propylene, can be copolymerized to form useful polymers which can have rubberlike properties. However, polymers formed from such olefins do not have ethylenic unsaturation and thus cannot be cured to form elastomeric materials by methods such as sulfur curing, which are normally used for curing natural and synthetic rubbers. One method for preparing polymers of alpha monoolefins which can be sulfur-cured is to incorporate various diolefin units therein. However, diolefins often polymerize slowly, inefficiently or not at all with the various alpha monoolefins. In particular, usually a considerable amount of crosslinked polymer is obtained. This is normally very undesirable because portions of the polymer that are crosslinked do not usually mix well, if at all, with the remainder of the polymer. Thus, the general processing of the polymer may be more difficult because of the presence of crosslinked portions. An even greater disadvantage can be evident when curatives are mixed with the polymer for the purpose of curing the polymer to form a useful elastomeric material. Usually poor mixing of the polymer and the curative compounds is obtained when appreciable portions of the polymer are crosslinked, thereby yielding an improperly cured elastomeric product.

Therefore, it is an object of this invention to provide a new sulfur-curable polymeric material. It is another object to provide a new hydrocarbon elastomer and a method of preparing the said elastomer. It is a further object of this invention to provide a new hydrocarbon polymer having a low crosslinked content and a method of preparing the said polymer.

In accordance with this invention it was found unexpectedly that a polymer capable of being sulfur cured comprises a polymer consisting essentially of units derived from ethylene, at least one alpha olefin having the structure $R - CH = CH_2$, where R is an alkyl radical having from 1 to 4 carbon atoms, and ethylidene bicycloheptene.

It was particularly discovered that a polymer having a low crosslinked content and capable of being sulfur cured to form an elastomeric material comprises a polymer consisting essentially of from about 20 to about 73 percent by weight units derived from ethylene, from about 25 to about 79 percent by weight units derived from an alpha olefin having the structure $R - CH = CH_2$, where R is an alkyl radical having from 1 to 4 carbon atoms, and from about 1.0 to about 15 percent by weight units derived from ethylidene bicycloheptene based on 100 percent by weight of the polymer. Such a polymer usually has an iodine number of from about 2 to about 25.

The polymers prepared according to this invention surprisingly generally have a negligible crosslinked content of about 2 percent by weight or less. Polymers have been prepared having crosslinked contents of from about zero to about 2 percent and usually from about 0.5 to about 1.5 percent by weight. The crosslinked content of the polymer is determined by the weight percent of a 0.25 gram sample of polymer which is not soluble in toluene at 80°C. after 48 hours of exposure.

Various alpha olefins having the structure $R - CH = CH_2$ can be used in the preparation of the polymer of this invention. Representative examples of the alpha olefins are alpha monoolefins having from 3 to 6 carbon atoms such as propylene, 1-butene, 1-pentene and 1-hexene.

In the practice of this invention, the polymer which can be sulfur cured is formed by polymerizing a mixture comprising ethylene, an alpha olefin having the structure $R - CH = CH_2$, where R is an alkyl radical having from 1 to 4 carbon atoms, and ethylidene bicycloheptene in the presence of a coordination catalyst.

A suitable coordination catalyst is prepared by mixing at least one vanadium compound selected from the group consisting of vanadium tetrachloride, vanadium oxytrichloride, vanadium acetylacetonate, vanadium oxy bis(acetylacetonate) and vanadium tri-n-butoxyvanadate and at least one organoaluminum compound selected from the group consisting of $R_3Al$, $R_2AlX$, $RAlX_2$, and $Al_2R_3X_3$ where R is an alkyl radical having from 1 to 12 carbon atoms such as a methyl, ethyl, isobutyl, isopropyl, n-propyl, isoamyl, isohexyl, heptyl, octyl, nonyl, decyl, unodecyl, or dodecyl radical and X is a chlorine or a bromine radical. The generally preferred organoaluminum compounds are aluminum triisobutyl, diethyl aluminum chloride, ethyl aluminum dichloride and ethyl aluminum sesquichloride.

The catalysts of this invention are prepared by mixing the components by well-known techniques. No particular order of mixing is required. The catalysts may be prepared by the "preformed" or "in-situ" techniques. By the preform method the catalyst components are mixed together prior to exposure of either component to the monomer to be polymerized. The in-situ method consists of adding the catalyst components to the monomer separately and is usually the preferred method. The catalyst components may be mixed either as pure compounds, or as suspensions or solutions in liquids which do not adversely affect the polymerization.

The amount of catalyst employed in the polymerizations of this invention may be varied over wide concentrations. Of course, a catalytic amount of the catalyst must be employed to cause polymerization of the monomer. The optimum amount of catalyst depends on a number of factors such as temperature, reactants used, purity of reactants, reaction times desired and the like. Those skilled in the art will readily determine the optimum catalytic ranges. While there is no maximum catalytic level, successful polymerizations have been conducted wherein the amount of total catalyst employed has ranged from about 0.04 to about 4 parts by weight per 100 parts by weight of monomer employed, although a range of from about 0.1 to about 1.5 is usually desirable, and a range of from about 0.2 to about 1.0 is usually more suitable. The term, total catalyst, is meant to include the weight of both the organoaluminum and the vanadium compounds.

In the catalyst composition the molar ratios of the organoaluminum compounds to the vanadium compounds may be varied over the range of from about 2 to about 15 or higher. However, a mol ratio of about 3 to about 10 is usually preferred. It will be recognized by those skilled in the art that the optimum molar ratio of the catalyst components may vary somewhat with the use of particular combinations of the catalyst components, the monomer being polymerized and the polymerization conditions used.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, isopentane, neopentane, heptane, hexane, 2,2,4-trimethyl pentane, petroleum ether, octane, and decane; liquid cycloaliphatic hydrocarbons such as cyclopentane, cyclohexane, methyl cyclohexane, decalin, and cyclooctane; and halogenated liquid aliphatic hydrocarbons such as tetrachloroethylene. Mixtures of such solvents may also be used.

Temperatures at which the polymerization reaction is carried out can be varied over a wide range. Usually the temperature can be varied from extremely low temperatures such as about −20°C. up to higher temperatures such as about 40°C. It is generally preferred, however, to conduct the reaction at a temperature in the range of from about −10°C. to about 20°C. The pressure at which the polymerization is carried out can also be varied over a wide range. The reaction can be conducted at atmospheric pressure or, if desired, it can be carried out at sub-atmospheric pressure or super-atmospheric pressure. Generally a satisfactory polymerization is obtained when the reaction is carried out at about autogenous pressure developed by the reactants under the operating conditions used.

The polymerization time will vary and can range from a few minutes to 24 hours or more, depending upon the polymerization conditions and the degree and extent of polymerization desired.

The polymerization reaction may be carried out as a batch or as a continuous process. In performing the polymerizations of this invention, the introduction of the monomer, catalyst, and solvent, when a solvent is employed, can each be made to the reaction zone alternately, intermittently, and/or continuously.

The polymers prepared according to this invention are rubbery in nature and may be cured to form useful elastomeric materials. The polymers may be cured by the methods and procedures known to those skilled in the art. In particular, the polymers can be cured with sulfur.

The polymers of this invention are useful in preparing rubbery, elastomeric articles. Some of the many articles in which these polymers may be employed are coated and molded articles such as tires, inner tubes, industrial products such as tubes and belts, and various coated fabrics.

The following illustrative examples are set forth to further exemplify the objects and advantages of the invention. The parts and percentages are by weight unless otherwise indicated.

EXAMPLE 1

A suitable reactor was equipped with stirrer, thermocouple well and gas inlet and outlet tubes, and charged under an inert atmosphere of dry nitrogen with 21,120 grams of benzene which had been dried and purified by passage through a column of silica gel.

The benzene was purged by distilling 1760 grams from the reactor. The benzene was then stirred and cooled to about 5°C. Agitation of the mixture was continued and ethylene and propylene were bubbled through the mixture at rates of 4.4 liters of ethylene and 3.6 liters of propylene per minute at atmospheric pressure. The ethylene and propylene had been pretreated by passage through a 15 percent solution of aluminum triisobutyl in kerosene and then through a column of molecular sieves. After about 30 minutes the benzene in the reactor was substantially saturated with the ethylene and propylene. While continuing to add the ethylene and propylene, 20 milliliters of a 0.75 molar solution of ethyl aluminum sesquichloride in benzene was added to the reactor followed by adding 15 milliliters of a 0.3 molar solution of vanadium oxytrichloride in benzene while continuously agitating the mixture in the reactor and adding the ethylene and propylene. Also, after the addition of the ethyl aluminum sesquichloride and vanadium oxytrichloride, 80 grams of ethylidene bicycloheptene was added to the mixture at 10 minute intervals in 10, 5, 10, 5, 10, 5, 10, 5, 5, 5, 5, 5, 5, and 5 milliliter increments. The ethylidene bicycloheptene had a boiling point of 55°C. at a reduced pressure of 32 millimeters of mercury. Also, after the initial addition of ethyl aluminum sesquichloride and vanadium oxytrichloride, at 20 minute intervals, increments of 7.5 milliliters of the 0.75 molar ethyl aluminum sesquichloride solution and increments of 5 milliliters of the 0.3 molar vanadium oxytrichloride solution were added over a period of time of 120 minutes. The reaction mixture temperature increased to about 20°C. while the ethylene and propylene were absorbed into the mixture very rapidly. The mixture in the reactor became steadily more viscous as the reaction proceeded. After 140 minutes the addition of ethylene and propylene was discontinued and polymerization reaction was stopped by deactivating the catalyst with about 100 milliliters of isopropyl alcohol. The resulting polymeric material was coagulated by adding about 12 liters of isopropyl alcohol containing 15 grams of 2,6-ditertiary butyl cresol to the mixture. The coagulated material was resuspended in isopropyl alcohol for 24 hours and then dried under a reduced pressure of about 25 milliliters of mercury at about 50°C. for about 16 hours. A yield of 1995 grams of an elastomeric polymer containing 54 percent propylene by weight and having an iodine number of 3.8 was obtained.

The polymer had a dilute solution viscosity (DSV) of 1.47, a gel content of 6.3 percent, a crosslinked content of less than 2 percent and a Mooney (ML-4 at 100°C.) of 103. The term "dilute solution viscosity" as used in this specification is defined as the ($\log_e$ Relative Viscosity)/(grams of polymer/100 milliliters of solution). "Relative Viscosity" is the viscosity of a solution of 0.5 grams of the polymer per 100 milliliters of solution at 30°C. divided by the viscosity of the solvent at 30°C. Toluene was used as the solvent. The gel content of the polymer is determined by the amount of 0.25 grams of polymer which is insoluble in 50 milliliters of toluene at 30°C. after 48 hours. The amount of crosslinked polymer is determined by the amount of 0.25 grams of polymer which is insoluble in 50 milliliters of toluene at 80°C. after 48 hours.

Twenty parts of the polymer were mixed on a rubber roll mill with 1 part zinc oxide, 0.3 parts tetramethyl thiuram monosulfide and 0.25 parts sulfur. A portion of this compounded polymer was cured by heating for 45 minutes at 160°C. The cured compounded polymer was elastomeric and had a swell volume of about 262 percent as determined by measuring the volumes of toluene imbibed per volume of sample of the vulcanized polymer under equilibrium conditions at 25°C.

Another portion of 100 parts of the polymer was mixed on a rubber roll mill with 60 parts SAF and 20 parts of HS-ISAF carbon black, 50 parts Circosol 4240 (obtained from the Sun Oil Company), 5 parts zinc oxide, 0.5 parts tetramethyl thiuram disulfide, 1.5 parts mercaptobenzothiazole, 2 parts zinc dibutyl dithiocarbamate, 0.5 parts of stearic acid and 3.0 parts sulfur. Samples of the compounded polymer were cured for various periods of time at 150°C. These cured samples were treated using conventional rubber testing procedures with the following results:

| Curing Time (Minutes) | Elongation (Percent) | Tensile Strength (Lbs/sq. inch) |
| --- | --- | --- |
| 15 | 550 | 2250 |
| 30 | 440 | 2425 |
| 60 | 360 | 2400 |
| 90 | 310 | 2400 |
| 120 | 310 | 2475 |

EXAMPLE 2

A suitable reactor was fitted with a stirrer, thermocouple well, and gas inlet and outlet tubes, and charged under an inert atmosphere of dry nitrogen with 860 grams of toluene. The toluene had been dried and purified by passage through a column of silica gel. The resulting toluene in the reactor was purged for 15 minutes with nitrogen at a rate of 1.5 liters of nitrogen per minute. The toluene was stirred and cooled to about 5°C. Agitation was continued and ethylene and propylene were bubbled through the mixture at rates of 500 cubic centimeters of ethylene and 500 cubic centimeters of propylene per minute at atmospheric pressure. The ethylene and propylene had been pretreated by passage through a 15 percent solution of aluminum triisobutyl in kerosene and a column of molecular sieves. After about 30 minutes the toluene in the reactor was substantially saturated with ethylene and propylene. While continuing to add the ethylene and propylene, 6 milliliters of a 0.75 molar solution of ethyl aluminum sesquichloride in toluene was added in 1 milliliter increments at 10 minute intervals to the reactor followed by adding 3 milliliters of a 0.3 molar solution of vanadium oxytrichloride in benzene in increments of 0.5 milliliters at 10 minute intervals while continuously agitating the mixture in the reactor and adding the ethylene and propylene. Also, after the addition of the aluminum sesquichloride, 5.56 grams of ethylidene bicycloheptene was added to the mixture at 5 minute intervals in 1 milliliter increments. The temperature of the reaction mixture increased to 15°C. while the ethylene and propylene were absorbed very rapidly. As the reaction proceeded the mixture became steadily more viscous. The polymerization was stopped by deactivating the catalyst with about 5 milliliters of isopropyl alcohol after 60 minutes and the addition of ethylene and propylene was discontinued. The resulting polymeric material was coagulated by adding about 800 milliliters of isopropyl alcohol containing 1 gram of 2,6-ditertiary butyl cresol to the reactor. The coagulated material was resuspended in isopropyl alcohol for 24 hours and then dried under a reduced pressure of about 25 millimeters of mercury at about 50°C. for about 16 hours. A yield of 73.7 grams of an elastomeric polymer containing 48 percent propylene by weight and having an iodine number of 5.9 was obtained. The polymer had a DSV of 1.30, a gel content of 2.8 percent, and a crosslinked content of less than 2 percent.

Twenty parts of the polymer were compounded on a rubber roll mill with 1 part of zinc oxide, 0.3 parts tetramethyl thiuram monosulfide and 0.25 parts sulfur. The compounded polymer was cured by heating for 45 minutes at 160°C. The cured compounded polymer was elastomeric and had a swell volume of about 278 percent as determined by measuring the volumes of toluene imbibed per volume of a sample of the vulcanized polymer under equilibrium conditions at 25°C. Generally, the swell volume is a measure of the extent of vulcanization. A well-cured ethylene-propylene elastomer generally has a swell volume of 300 to 400 percent.

EXAMPLE 3

A polymerization was conducted according to the method of Example 2 except that 580 grams of heptane was used as a solvent instead of the benzene. A yield of 42 grams of an elastomeric polymer containing 39 percent propylene by weight and having an iodine number of 12.5 was obtained. The polymer had a DSV of 2.48, a gel content of 10.7 percent and a crosslinked content of less than 1 percent.

The polymers prepared according to this invention generally have dilute solution viscosities of from about 0.8 to about 3, depending upon variables such as the monomer ratios, solvents and diluents, catalyst compositions, and reaction temperatures used. Usually, it is desired to prepare the polymers of this invention having dilute solution viscosities of from about 1.2 to about 2.5.

While certain representative embodiments and details have been shown for the purpose of illustrating the invention, it will be apparent to those skilled in this art that various changes and modifications may be made therein without departing from the spirit or scope of the invention.

I claim:

1. A polymer, having a low cross-linked content, consisting essentially of from about 20 to about 73 percent by weight of units derived from ethylene, from about 25 to about 70 percent by weight of units derived from propylene, and from about 1.0 to about 3.5 percent by weight of units derived from ethylidene bicycloheptane having a boiling point of about 55°C at a reduced pressure of about 32 millimeters of mercury based on 100 percent by weight of the polymer, and wherein the said polymer has a dilute solution viscosity in the range of from about 0.8 to about 3 and a crosslinked content of less than about 1.5 percent by weight, determined by the amount of 0.25 gram of polymer which is insoluble in 50 milliliters of toluene at 80°C after 48 hours, prepared by the method which comprises polymerizing the monomers ethylene, propylene and said bicycloheptene by incremental addition of said monomers to the polymerizate at a temperature in the range of about −20°C to about 40°C in the presence of a solvent and a catalyst prepared by mixing at least one vanadium compound selected from the group consisting of vanadium tetrachloride, vanadium oxytrichloride, vanadium acetylacetonate, vanadium oxy bis(acetylacetonate) and vanadium tri-n-butoxyvanadate and at least one organoaluminum compound selected from the group consisting of aluminum triisobutyl, diethylaluminum chloride, ethylaluminum dichloride and ethylaluminum sesquichloride, where the mole ratio of aluminum to vanadium is from about 3/1 to about 10/1, where said solvent is selected from benzene, toluene, tetralin, pentane, isopentane, neopentane, heptane, hexane, 2,2,4-trimethyl pentane, petroleum ether, cyclopentane, cyclohexane, methyl cyclohexane, decalin and tetrachloroethylene, and where said dilute solution viscosity can be determined from relating the viscosities of a toluene solution of 0.5 gram of said polymer per 100 milliliters of solution and of said toluene at 30°C.

2. The polymer of claim 1, containing up to about 3.5 weight percent units derived from ethylidene bicycloheptene, and prepared by polymerizing with a catalyst prepared from vanadium oxytrichloride and ethyl aluminum sesquichloride and where said polymer is recovered by coagulation with isopropyl alcohol and 2,6-ditertiary butyl cresol and where said bicycloheptene is incrementally added.

3. The polymer of claim 1 prepared by polymerizing with a catalyst prepared from vanadium oxy bis(acetylacetonate) and an organoaluminum compound selected from aluminum triisobutyl, diethylaluminum chloride, ethylaluminum dichloride and ethylaluminum sesquichloride.

4. The polymer of claim 1 prepared by polymerizing with a catalyst prepared from vanadium oxy bis(acetylacetonate) and an organoaluminum compound selected from aluminum triisobutyl, diethylaluminum chloride, ethylaluminum dichloride and ethylaluminum sesquichloride and where said dilute solution viscosity can be determined from relating the viscosities of a toluene solution of 0.5 gram of said polymer per 100 milliliters of solution and of said toluene at 30°C.

* * * * *